(12) United States Patent　　(10) Patent No.: US 12,630,114 B2
Nishino et al.　　(45) Date of Patent:　May 19, 2026

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Atsushi Nishino, Aichi (JP); Kazuhiro Yamada, Aichi (JP)

(73) Assignee: KABUSHIKI KAISHA TOKAI-RIKA-DENKI-SEISAKUSHO, Niwa-gun (JP)

(*) Notice: Subject to any disclaimer, the term of this patent is extended or adjusted under 35 U.S.C. 154(b) by 92 days.

(21) Appl. No.: 18/660,907

(22) Filed: May 10, 2024

(65) Prior Publication Data

US 2024/0383435 A1　Nov. 21, 2024

(30) Foreign Application Priority Data

May 16, 2023　(JP) ................................. 2023-080887

(51) Int. Cl.
B60R 22/34 (2006.01)
(52) U.S. Cl.
CPC .................................... B60R 22/34 (2013.01)
(58) Field of Classification Search
CPC ........ B60R 22/34; B60R 22/46; B60R 22/405
See application file for complete search history.

(56) References Cited

U.S. PATENT DOCUMENTS

| | | | | | |
|---|---|---|---|---|---|
| 9,884,607 | B2 * | 2/2018 | Hodatsu | .................. | B60R 22/38 |
| 2011/0290930 | A1 * | 12/2011 | Tatsuma | .................. | B60R 22/38 |
| | | | | | 242/383.2 |
| 2020/0172046 | A1 * | 6/2020 | Owaki | .................. | B60W 40/08 |
| 2022/0001833 | A1 * | 1/2022 | Owaki | .................. | B60R 22/343 |

FOREIGN PATENT DOCUMENTS

JP　　　2018111398 A　　7/2018

* cited by examiner

*Primary Examiner* — Sang K Kim
(74) *Attorney, Agent, or Firm* — Dority & Manning, PA

(57) ABSTRACT

A webbing take-up device includes a spool, a lock base, and a lock member. The lock base includes a lock base body equipped with a load bearing portion, and a shaft portion. The lock member includes a shaft portion insertion hole for insertion of the shaft portion, and on actuation displaces from a housed position to an engaged position to limit rotation of the spool in the pull-out direction. Shapes and dimensions of the shaft portion and the shaft portion insertion hole are set such that, when a load accompanying pull-out of the webbing from the spool has been input from the lock member positioned at the engaged position to the lock base, the load is input from the lock member to the load bearing portion and an outer peripheral face of the shaft portion and an inner peripheral face of the shaft portion insertion hole are separated from each other.

3 Claims, 6 Drawing Sheets

WEBBING TAKE-UP DEVICE

CROSS-REFERENCE TO RELATED APPLICATION

This application is based on and claims priority under 35 USC 119 from Japanese Patent Application No. 2023-080887 filed on May 16, 2023, the disclosure of which is incorporated by reference herein.

BACKGROUND

Technical Field

The present disclosure relates to a webbing take-up device.

Related Art

A webbing take-up device disclosed in Japanese Patent Application Laid-Open (JP-A) No. 2018-111398 includes a spool, a lock base that rotates together with the spool, and a lock member (lock pawl) that is supported by the lock base. In the webbing take-up device described in this related document, a circular pillar shaped shaft portion (pawl pin) provided to the lock base is inserted into a hole portion formed in the lock member. The lock member is thereby able to pivot about the shaft portion. Rotation of the spool in a pull-out direction is configured so as to be limited by the lock member pivoting about the shaft portion, and the lock member engaging with ratchet teeth.

However, load from the lock member is input to the shaft portion engaged by the lock member. This conceivably limits material selection for the shaft portion and impedes making the shaft portion build more compact.

SUMMARY

In consideration of the above circumstances, an object of the present disclosure is to provide a webbing take-up device capable of suppressing limitation of material selection for a shaft portion engaged by a lock member, and capable of suppressing making the shaft portion build more compact from being impeded.

A webbing take-up device of a first aspect includes a spool, a lock base, and a lock member. The spool is able to take up webbing fitted over an occupant, with the webbing being taken up by the spool being rotated in a take-up direction, and with the spool being rotated in a pull-out direction by the webbing being pulled out. The lock base is provided so as to be capable of rotating together with the spool and includes a lock base body equipped with a load bearing portion and a shaft portion formed as a single body with the lock base body. The lock member includes a shaft portion insertion hole for inserting the shaft portion into, and on actuation displaces from a first position to a second position to limit rotation of the spool in the pull-out direction. Shapes and dimensions of the shaft portion and the shaft portion insertion hole are set such that, when a load accompanying pull-out of the webbing from the spool has been input from the lock member positioned at the second position to the lock base, the load is input from the lock member to the load bearing portion and an outer peripheral face of the shaft portion and an inner peripheral face of the shaft portion insertion hole are separated from each other.

A webbing take-up device according to a second aspect is the webbing take-up device of the first aspect, wherein the lock member is rotationally displaced between the first position and the second position, and a rotation center position of the lock member is changed by changing an orientation of the lock base.

A webbing take-up device according to a third aspect is the webbing take-up device of the first aspect or the second aspect, further including an actuation member that is capable of rotating with respect to the lock base and that is provided with an elongated shaped actuation portion. The lock member includes an actuation portion engagement portion that engages with the actuation portion. The lock member is displaced between the first position and the second position by the actuation portion engagement portion moving along the actuation portion. In a state in which the lock member is positioned at the first position, the actuation portion engagement portion abuts an end portion on a length direction one side of the actuation portion and also an outer peripheral face of the shaft portion abuts an inner peripheral face of the shaft portion insertion hole.

In the webbing take-up device according to the first aspect, the webbing is taken up on the spool when the spool is rotated in the take-up direction. The spool is rotated in the pull-out direction by the webbing being pulled out from the spool. The spool rotates together with the lock base. The lock base includes a lock base body including a load bearing portion and a shaft portion formed as a single body with the lock base body. The shaft portion of the lock base is inserted into the shaft portion insertion hole of the lock member. When the lock member is actuated and the lock member is displaced from the first position to the second position, rotation of the spool in the pull-out direction is limited. The shapes and dimensions of the shaft portion and the shaft portion insertion hole are set such that when load accompanying pull-out of the webbing from the spool has been input from the lock member positioned at the second position to the lock base, the load is input from the lock member to the load bearing portion and the outer peripheral face of the shaft portion and the inner peripheral face of the shaft portion insertion hole are separated from each other. The load is thereby able to be prevented or suppressed from being input from the lock member to the shaft portion. As a result thereof, neither selection of the material of the shaft portion, nor setting of the dimensions of the shaft portion, need to consider the strength, rigidity, or the like of the shaft portion. Thus in this manner the webbing take-up device according to the first aspect is able to suppress limitation to the selection of the material of the shaft portion and is able to suppress making of the shaft portion build more compact from being impeded.

In the webbing take-up device according to the second aspect, the rotation center position of the lock member can be changed by changing the orientation of the lock base.

In the webbing take-up device according to the third aspect, the actuation portion engagement portion of the lock member moves along the actuation portion of the actuation member, and so the lock member is displaced between the first position and the second position. In a state in which the lock member is positioned at the first position, the actuation portion engagement portion abuts the end portion on the length direction one side of the actuation portion, and also the outer peripheral face of the shaft portion abuts the inner peripheral face of the shaft portion insertion hole. This thereby enables the lock member to be suppressed from vibrating in a state in which the lock member is positioned at the first position.

BRIEF DESCRIPTION OF THE DRAWINGS

Exemplary embodiments of the present invention will be described in detail based on the following figures, wherein.

DETAILED DESCRIPTION

Description follows regarding a webbing take-up device 10 according to an exemplary embodiment of the present disclosure, with reference to FIG. 1A to FIG. 5.

Figure 1A:
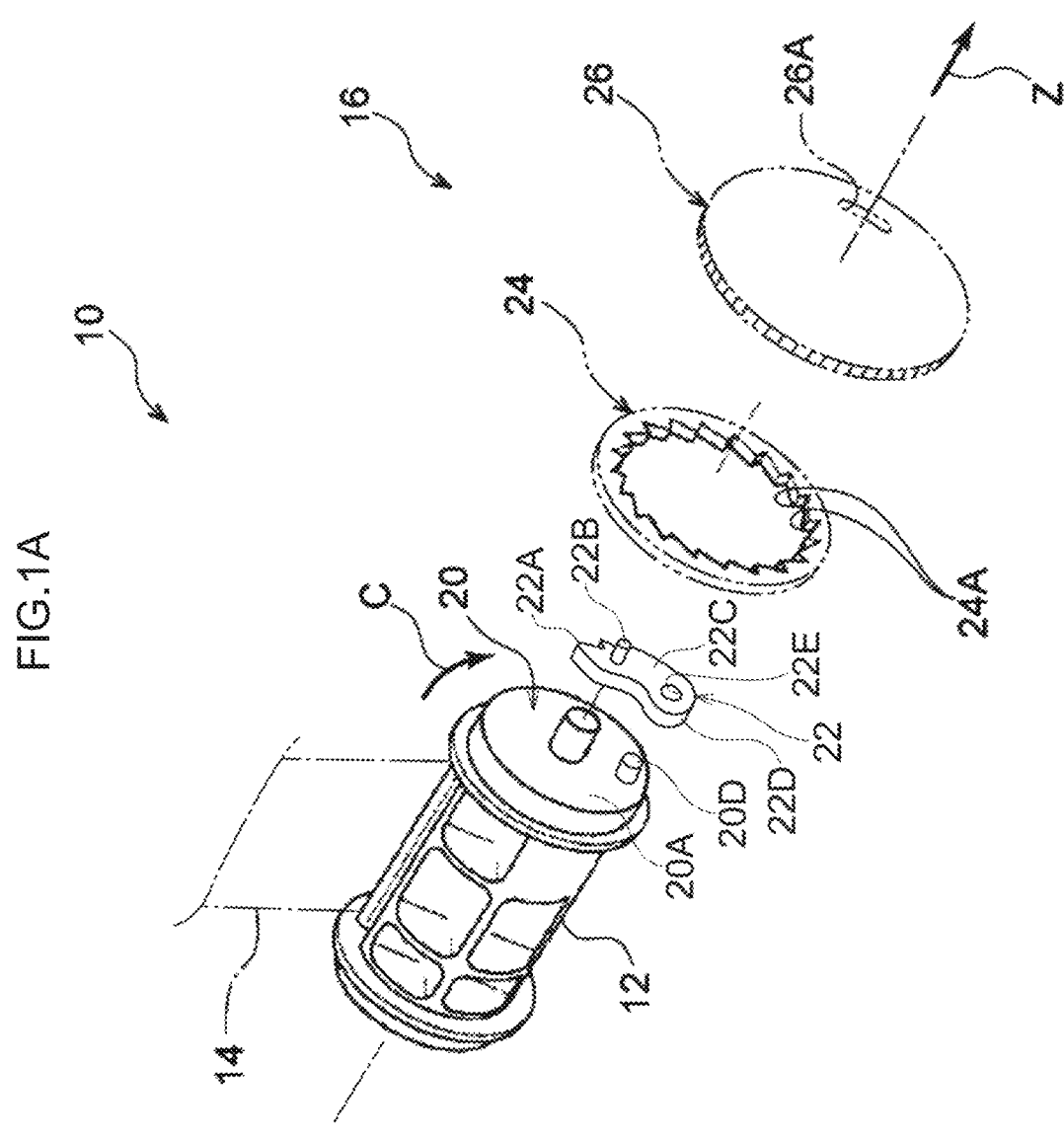
FIG. 1A is an exploded perspective view illustrating a spool, a lock member, and the like configuring part of a webbing take-up device.
Figure 2:
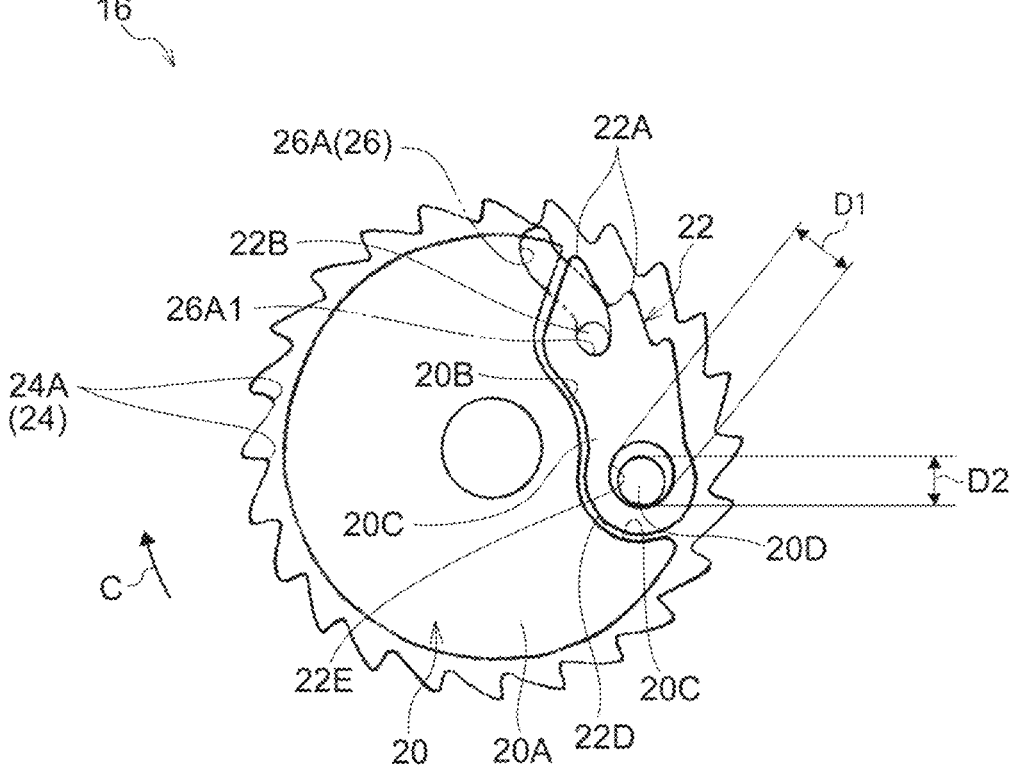
FIG. 2 is a schematic diagram illustrating each member configuring a lock mechanism as viewed from an axial direction one side, and illustrates a state prior to actuation of the lock mechanism.

As illustrated in FIG. 1A and FIG. 2, the webbing take-up device 10 of the present exemplary embodiment includes a spool 12, webbing 14, and a lock mechanism 16. Note that unless specifically stated otherwise, reference below simply to axial direction, radial direction, and circumferential direction indicates a rotation axial direction, a rotation radial direction, and a rotation circumferential direction of the spool 12.

As illustrated in FIG. 1A, the spool 12 is formed in a substantially circular cylinder shape. The spool 12 is rotatably supported between a pair of legs of a non-illustrated frame. A non-illustrated torsion shaft configuring a force meter mechanism is disposed inside the spool 12. A lock base 20 is provided at an axial direction one side (arrow Z direction side) of the spool 12. The lock base 20 is coupled to the spool 12 through the torsion shaft. This means that the lock base 20 is able to rotate together with the spool 12. Note that the spool 12 is urged to rotate in a take-up direction by a non-illustrated take-up urging mechanism.

The webbing 14 is fitted over the body of an occupant seated in a vehicle seat, and a base end portion of the webbing 14, which is a length direction one-end portion thereof, is anchored to the spool 12. The spool 12 is urged to rotate in the take-up direction (the direction of arrow C in FIG. 1A etc.), which is a rotation one direction, by urging force of a flat spiral spring configuring part of the take-up urging mechanism. The webbing 14 is configured so as to be taken up on the spool 12 from its base end side by the spool 12 being rotated in the take-up direction. The spool 12 is configured so as to be rotated in a pull-out direction (a direction opposite to the arrow C in FIG. 1A etc.), which is a rotation other direction, by the webbing 14 being pulled out from the spool 12.

Next, description follows regarding the lock mechanism 16, a relevant portion of the present exemplary embodiment. As illustrated in FIG. 1A, the lock mechanism 16 includes the lock base 20, a lock member 22 supported by the lock base 20, and a lock member engagement section 24 that the lock member 22 engages with. Moreover, the lock mechanism 16 includes an actuation member 26 provided so as to be able to rotate as one with the spool 12.

Figure 1B:
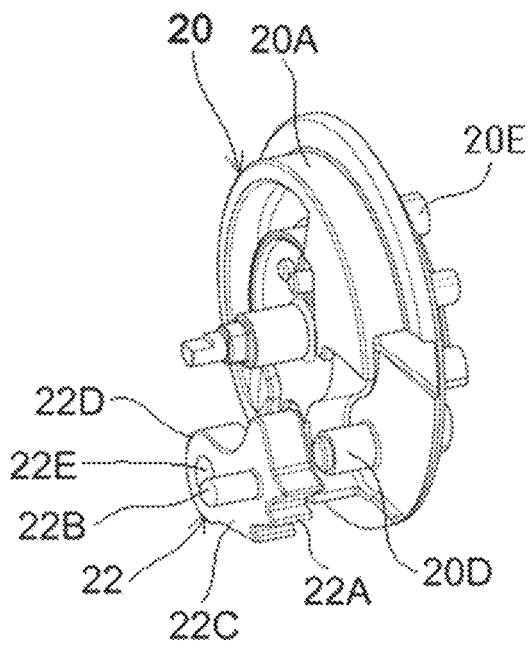
FIG. 1B is a perspective view illustrating a lock base and the like of another embodiment.

Note that, as illustrated in FIG. 1B, the lock base 20 may configure part of a pre-tensioning mechanism. Pinion teeth 20E that a non-illustrated rack member engages with are formed to the lock base 20. The lock base 20 is configured so as to be rotated in the take-up direction by movement of the rack in a state in which the rack member is engaged with the pinion teeth 20E.

As illustrated in FIG. 1A and FIG. 2, the lock base 20 is formed using a metal material, and as an example is made from die cast aluminum. The lock base 20 includes a lock base body 20A formed in a substantially circular plate shape. As illustrated in FIG. 2, a lock member placement portion 20B, which is a space open at the radial direction outside and the axial direction one side, is formed to part of an outer peripheral portion of the lock base body 20A. The lock member 22 is configured so as to be disposed in the lock member placement portion 20B. Note that illustration of the lock member placement portion 20B is omitted in FIG. 1A.

As illustrated in FIG. 2, a surface of the lock base body 20A disposed facing a supported portion 22D of the lock member 22, described later, is configured by a load bearing portion 20C. The shape of the load bearing portion 20C as viewed from the axial direction is curved in a shape corresponding to an outer peripheral face of the supported portion 22D of the lock member 22.

The lock base 20 also includes a shaft portion 20D that projects from the lock base body 20A toward the inside of the lock member placement portion 20B and toward the axial direction one side. The shaft portion 20D is formed in a circular pillar shape. The axial direction of the shaft portion 20D and the rotation axial direction of the lock base 20 are parallel to each other. In the present exemplary embodiment, the shaft portion 20D and the lock base 20 are formed as a single body using the same material.

As illustrated in FIG. 1A and FIG. 2, the lock member 22 is formed in a block shape using a metal material. The lock member 22 includes a lock member body 22C disposed inside the lock member placement portion 20B. A base end side of the lock member body 22C is configured by the supported portion 22D supported at the lock member placement portion 20B provided to the lock base 20, described later, so as to be able to tilt (rotate). A shaft portion insertion hole 22E is formed in the supported portion 22D piercing through the supported portion 22D in the axial direction. An inner peripheral face of the shaft portion insertion hole 22E is formed as a circular cylinder surface shaped to correspond to the outer peripheral face of the shaft portion 20D. In the present exemplary embodiment, an inner diameter D1 of the shaft portion insertion hole 22E is set to a larger outer diameter than the outer diameter D2 of the shaft portion 20D. The lock member 22 is supported by the lock base 20 in a state in which the shaft portion 20D is inserted into the shaft portion insertion hole 22E.

Figure 3:
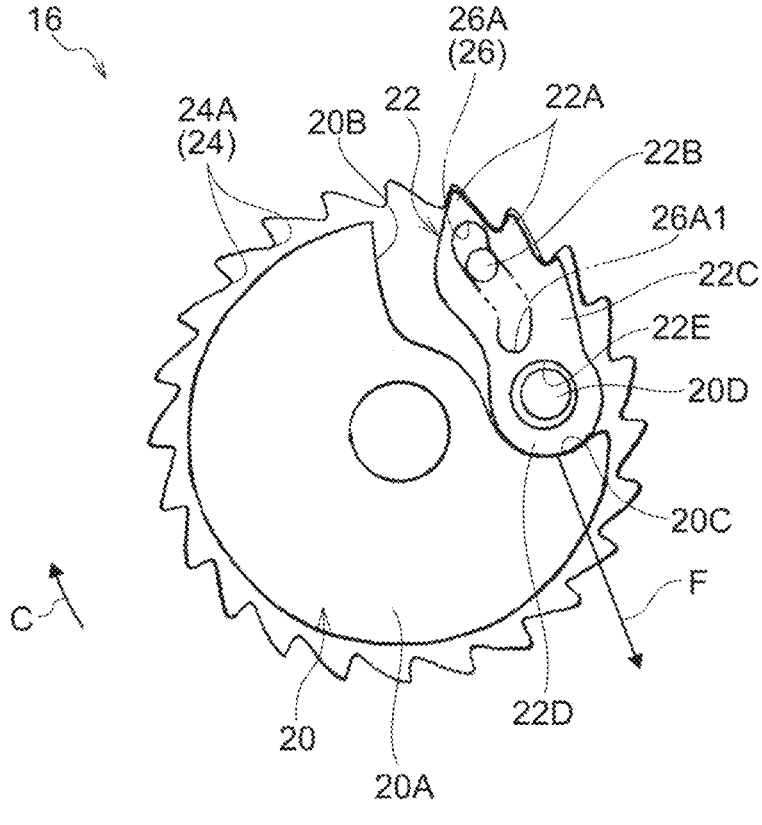
FIG. 3 is a schematic diagram illustrating each member configuring a lock mechanism as viewed from an axial direction one side, and illustrates a state in which the lock mechanism has been actuated.

Lock member engagement teeth 22A for engaging with lock member engaged teeth 24A of the lock member engagement section 24, described later, are formed to a radial direction outside of a leading end side of the lock member body 22C. As illustrated in FIG. 3, the lock member engagement teeth 22A are configured so as to engage with the lock member engaged teeth 24A of the lock member engagement section 24 by the lock member 22 tilting (displacing) toward the radial direction outside in a state in which the supported portion 22D of the lock member 22 is supported by the lock base 20. Note that a position of the lock member 22 in a state in which all of the lock member body 22C is disposed inside the lock member placement portion 20B (the state illustrated in FIG. 2) is called a housed position, serving as a first position. A position of the lock member 22 in a state in which the lock member engagement teeth 22A are fully engaged with the lock member engaged teeth 24A (the state illustrated in FIG. 3) is called an engaged position, serving as a second position.

The lock member 22 includes a circular pillar shaped actuation portion engagement portion 22B that projects from a leading end side of the lock member body 22C toward the axial direction one side.

As illustrated in FIG. 1A, the lock member engagement section 24 is configured, as an example, by a leg piece of the non-illustrated frame. The plural lock member engaged teeth 24A are formed along the circumferential direction at an inner peripheral portion of the lock member engagement section 24.

The actuation member 26 is formed, as an example, in a circular plate shape. A radial direction center portion of the actuation member 26 is rotatably supported by the lock base 20 and the like. Moreover, an actuation groove 26A, serving as an actuation portion that the actuation portion engagement portion 22B of the lock member 22 is disposed inside, is formed at the radial direction outside portion of the actuation member 26 that is supported by the lock base 20 and the like. The shape of the actuation groove 26A when viewed from the axial direction is an elongated shape (elongated hole shape). The actuation member 26 is urged to rotate in the pull-out direction with respect to the lock base 20 by a non-illustrated coil spring provided between the actuation member 26 and the lock base 20, and also the operating member 26 is locked from rotating in the pull-out direction with respect to the lock base 20 by the coil spring. A rotation limiting mechanism is provided in surroundings of the actuation member 26 that actuates during sudden vehicle deceleration and when the webbing 14 has been pulled out suddenly from the spool 12 (in a vehicle emergency). Rotation of the actuation member 26 in the pull-out direction is configured so as to be limited by actuation of the rotation limiting mechanism.

Operation and Advantageous Effects of Present Exemplary Embodiment

Next, description follows regarding the operation and advantageous effects of the present exemplary embodiment.

As illustrated in FIG. 1A, with the webbing take-up device 10 of the present exemplary embodiment, the webbing 14 is fitted across an occupant seated in a vehicle seat by the webbing 14 being pulled out from the spool 12.

In an emergency of the vehicle equipped with the webbing take-up device 10 of the present exemplary embodiment, the rotation limiting mechanism is actuated and rotation of the actuation member 26 is limited in the pull-out direction.

Then the body of an occupant seated in the vehicle seat is moved toward the seat front side by vehicle deceleration and the like and, as illustrated in FIG. 1A to FIG. 3, the webbing 14 is pulled out from the spool 12, and the spool 12 is rotated in the pull-out direction together with the lock member 22. This means that the actuation portion engagement portion 22B of the lock member engagement section 24 is moved along the actuation groove 26A of the rotation-limited actuation member 26, and the lock member engagement teeth 22A of the lock member 22 engage with the lock member engaged teeth 24A of the lock member engagement section 24. As a result thereof, the rotation of the spool 12 in the pull-out direction is limited (locked), and pull-out of the webbing 14 from the spool 12 is limited. The body of the occupant seated in the vehicle seat is accordingly restrained by the webbing 14.

Relevant Configuration of Present Exemplary Embodiment

Next, description follows regarding relevant configuration of the present exemplary embodiment.

As illustrated in FIG. 1A to FIG. 3, in a state in which the lock member engagement teeth 22A of the lock member 22 are engaged with the lock member engaged teeth 24A of the lock member engagement section 24 and rotation of the spool 12 in the pull-out direction has been limited, a high tension arises in the webbing 14 due to the load accompanying the webbing 14 being pulled out from the spool 12. This means that, as illustrated in FIG. 3, a load F accompanying the webbing 14 being pulled out from the spool 12 is input to the lock base 20 from the lock member 22 positioned in the engaged position. In the present exemplary embodiment, the load F is configured so as to be input from the supported portion 22D of the lock member 22 to the load bearing portion 20C of the lock base 20. In addition thereto, in the present exemplary embodiment, the shape and the dimensions D1, D2 of the shaft portion 20D and the shaft portion insertion hole 22E are set such that the outer peripheral face of the shaft portion 20D and the inner peripheral face of the shaft portion insertion hole 22E are separated in a state in which the load F is being input from the supported portion 22D of the lock member 22 to the load bearing portion 20C of the lock base 20, namely, in a state in which the supported portion 22D of the lock member 22 positioned at the engaged position is in contact with the load bearing portion 20C of the lock base 20. Thus in the present exemplary embodiment, the load F can be prevented or suppressed from being input from the lock member 22 to the shaft portion 20D. As a result thereof, there is no need to select the material of the shaft portion 20D, nor to set of dimensions of the shaft portion 20D, in consideration of the strength, rigidity, and the like of the shaft portion 20D. In this manner, the present exemplary embodiment enables selection of the material for the shaft portion 20D to be suppressed from being limited, and enables making the shaft portion 20D build more compact to be suppressed from being impeded.

Moreover as illustrated in FIG. 1A and FIG. 2, in the present exemplary embodiment, in a state in which the lock member 22 is positioned at the housed position, the actuation portion engagement portion 22B abuts an end portion 26A1 on a length direction one side of the actuation groove 26A, and also the outer peripheral face of the shaft portion 20D is configured so as to abut the inner peripheral face of the shaft portion insertion hole 22E. This thereby enables the lock member 22 to be suppressed from vibrating in a state in which the lock member 22 is positioned at the housed position.

Figure 4:
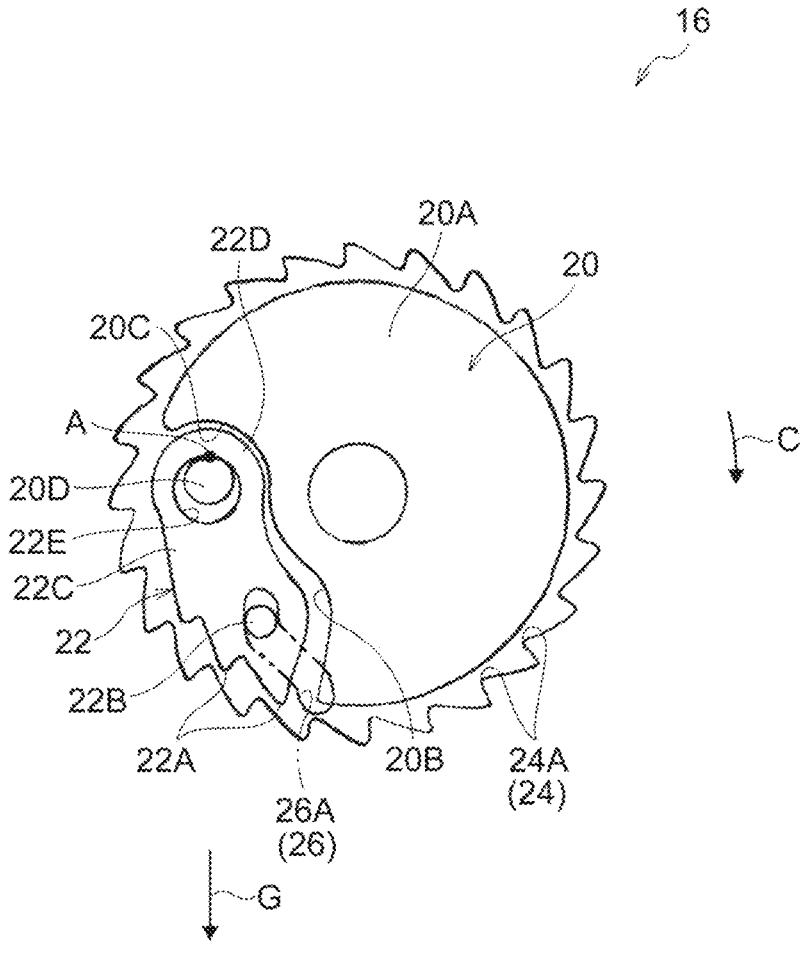
FIG. 4 is a schematic diagram illustrating each member configuring a lock mechanism as viewed from an axial direction one side, and illustrates a state when the lock mechanism has started to actuate.
Figure 5:
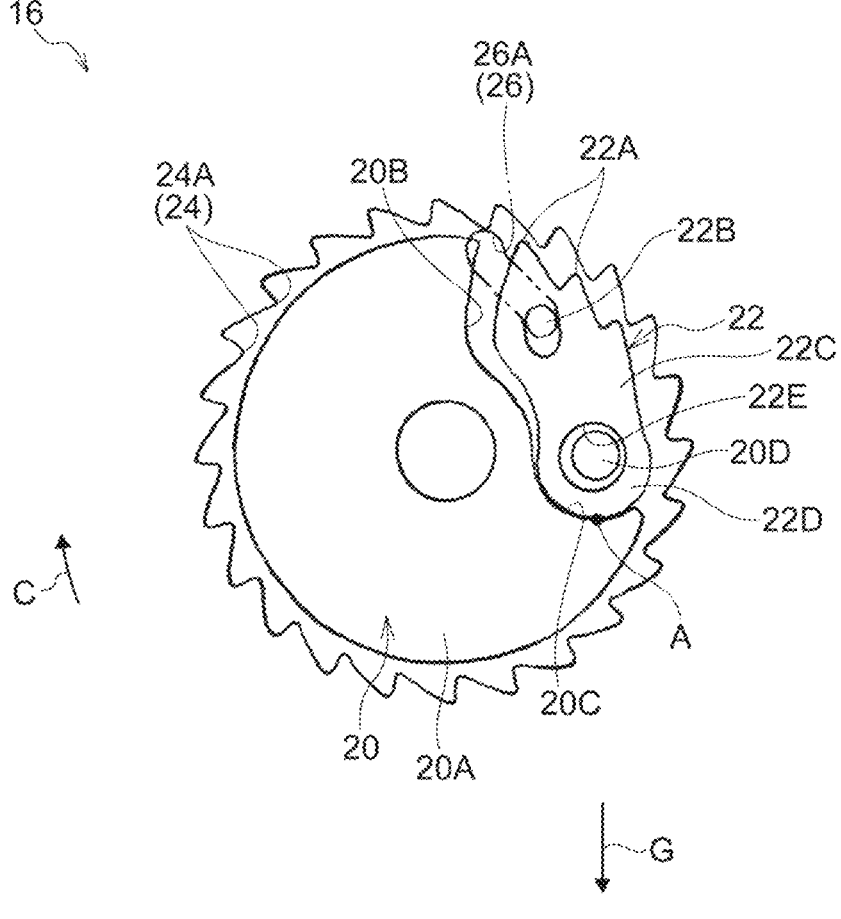
FIG. 5 is a diagram illustrating each member configuring a lock mechanism as viewed from an axial direction one side, and illustrates a state in which the lock mechanism has started to actuate.

Moreover, as illustrated in FIG. 4 and FIG. 5, in the present exemplary embodiment, a rotation center position A of the lock member 22 is configured so as to change by changing the orientation of the lock base 20. Specifically, in FIG. 4 the lock base 20 and the like are illustrated in an orientation such that gravity acts in the arrow G direction. In cases in which the lock member 22 is displaced from the housed position toward the engaged position side while the lock base 20 is oriented in such a state, at the rotation center position A of the lock member 22 there is point contact between the outer peripheral face of the shaft portion 20D and the inner peripheral face of the shaft portion insertion hole 22E. Moreover, in FIG. 5 the lock base 20 and the like are illustrated in an orientation such that gravity acts in the arrow G direction. In cases in which the lock member 22 is displaced from the housed position toward the engaged position side in a state in which the lock base 20 is in such an orientation, at the rotation center position A of the lock member 22 there is point contact between the supported portion 22D and the load bearing portion 20C. In a state in which the lock member engagement teeth 22A of the lock member 22 are engaged with the lock member engaged teeth 24A of the lock member engagement section 24 and rotation of the spool 12 is limited in the pull-out direction, as illustrated in FIG. 3, the outer peripheral face of the shaft portion 20D and the inner peripheral face of the shaft portion insertion hole 22E are separated, and also the supported portion 22D of the lock member 22 is in a state of contact with the load bearing portion 20C of the lock base 20. As described above, in the present exemplary embodiment, the rotation center position A of the lock member 22 can be changed by changing the orientation of the lock base 20. This thereby enables the lock member 22 and the lock base 20 to be suppressed from continuing to contact each other at the same position when the lock member 22 is displaced from the housed position toward the engaged position side.

Note that although in the present exemplary embodiment the example described is configured such that the rotation center position A of the lock member 22 is changed by changing the orientation of the lock base 20, the present disclosure is not limited thereto. Whether or not to adopt a configuration in which the rotation center position A of the lock member 22 is changed by changing the orientation of the lock base 20 may be appropriately set in consideration of the material and the like of the lock member 22 and the lock base 20.

Moreover, the present exemplary embodiment has been described for an example in which, in a state in which the lock member 22 is positioned at the housed position, vibration of the lock member 22 positioned at the housed position is suppressed by the actuation portion engagement portion 22B abutting the end portion 26A1 of the length direction one side of the actuation groove 26A, and also the outer peripheral face of the shaft portion 20D abutting the inner peripheral face of the shaft portion insertion hole 22E, however the present disclosure is not limited thereto. For example, another configuration may be suitably applied to suppress vibration of the lock member 22.

This ends description of exemplary embodiments of the present disclosure, however there is no limitation thereto, and obviously various other modifications may be implemented within a scope not departing from the spirit of the present disclosure.

What is claimed is:

1. A webbing take-up device comprising:
a spool that is able to take up webbing fitted over an occupant, with the webbing being taken up by the spool being rotated in a take-up direction, and with the spool being rotated in a pull-out direction by the webbing being pulled out;
a lock base that is provided so as to be capable of rotating together with the spool and that includes a lock base body equipped with a load bearing portion and a shaft portion formed as a single body with the lock base body; and
a lock member that includes a shaft portion insertion hole for inserting the shaft portion into, and on actuation, displaces from a first position to a second position to limit rotation of the spool in the pull-out direction,
wherein shapes and dimensions of the shaft portion and the shaft portion insertion hole are set such that, when a load accompanying pull-out of the webbing from the spool has been input from the lock member positioned at the second position to the lock base, the load is input from the lock member to the load bearing portion, and an outer peripheral face of the shaft portion and an inner peripheral face of the shaft portion insertion hole are separated from each other.

2. The webbing take-up device of claim 1, wherein:
the lock member is rotationally displaced between the first position and the second position; and
a rotation center position of the lock member is changed by changing an orientation of the lock base.

3. The webbing take-up device of claim 1, further comprising an actuation member that is rotatable with respect to the lock base and that is provided with an elongated shaped actuation portion, wherein:
the lock member includes an actuation portion engagement portion that engages with the actuation portion;
the lock member is displaced between the first position and the second position by the actuation portion engagement portion moving along the actuation portion; and
in a state in which the lock member is positioned at the first position, the actuation portion engagement portion abuts an end portion on a length direction one side of the actuation portion, and an outer peripheral face of the shaft portion abuts an inner peripheral face of the shaft portion insertion hole.

* * * * *